United States Patent Office 3,794,671
Patented Feb. 26, 1974

3,794,671
CATALYSTS AND COMPOSITIONS THEREFOR
Geoffrey Wilkinson, London, England, assignor to Johnson, Matthey & Co., Limited, London, England
No Drawing. Filed July 20, 1971, Ser. No. 164,495
Claims priority, application Great Britain, July 22, 1970, 35,437/70
Int. Cl. C07f 15/00
U.S. Cl. 260—429 R    3 Claims

ABSTRACT OF THE DISCLOSURE

Nonhalogen or pseudo-halogen coordination complexes of Rh(I) containing a stabilizing donor ligand. The complexes are made by adding a compound which acts as a stabilizing donor ligand to a solution of a rhodium (II) carboxylate protonated by an acid. The complexes are useful catalysts.

This invention relates to new compounds of rhodium and the methods of preparing such compounds. More particularly the invention relates to solid salts of Rh(I) which may be obtained in the presence of a stabilizing donor ligand (L).

Such compounds provide a stable and convenient source of Rh(I), a valency state of rhodium having particular importance in the catalysis of reactions such as hydrogenation, oxidation, decarbonylation, isomerization or hydroformylation.

According to this invention new compositions of matter comprise a nonhalogen or pseudo-halogen coordination complex of Rh(I) containing a stabilizing donor ligand.

By "nonhalogen or pseudo-halogen coordination complexes" we mean those complexes in which halogen is not coordinated to the central Rh(I) atom. Halogen may, of course, be a substituent in an organic ligand, for example.

According to another feature of this invention a method of manufacture of salts of Rh(I) containing a stabilizing donor ligand comprises the addition of a compound which acts as a stabilizing donor ligand to a solution of a rhodium (II) carboxylate protonated by an acid. Preferably the acid is a strong acid.

The said salts of Rh(I) may be obtained as solids, if desired.

Preferably, the complex has the general formula $RhAn(CO)_xL_y$ where An is a monovalent anion other than halogen or pseudo-halogen, L is a stabilizing donor ligand, $x$ is 0 or 1, and $y$ is 2 or 3.

The monovalent anion An may have the general formula (OCOR) in which R is an alkyl or aryl or substituted alkyl or aryl group.

R may be methyl, ethyl, propyl, butyl, pentyl, benzyl, phenyl or an halogeno-substituted alkyl or aryl group. The halogen may be fluorine or chlorine and conveniently the fluorine- or chlorine-substituted alkyl group is selected from the group consisting of $-CH_2Cl$, $-CClF_2$, $-CF_3$, $-C_2F_5$, $-CCl_2F$, $-C_2H_4Cl$, $-C_2H_4F$ and $-C_2Cl_5$.

The invention also includes a method of manufacturing salts of Rh(I) containing a stabilizing donor ligand and an anion An, comprising the addition to a solution of rhodium (II) carboxylate, protonated by an acid, an alkali metal salt containing the anion An and a compound L which acts as a stabilizing donor ligand.

Preferably the acid is a strong acid, the alkali metal is lithium and an excess of the compound L is added. Preferably also, the reaction is performed by refluxing the alkali metal salt with an alcoholic solution of protonated Rh(II) carboxylate in the presence of excess L.

By the use of this method we have prepared a new series of useful compounds Rh An $L_3$ where An is preferably carboxylate but may be fluorborate or nitrate and L is $PPh_3$ (triphenylphosphine).

We have found that the new compositions of matter according to the present invention are particularly suitable as catalysts in hydrogenation, hydroformylation and carbonylation reactions; especially so when they are in solution where it is believed that the cation plays a major role in the mechanism of catalysis.

Some suitable donor ligands are:

$R_1R_2R_3P$
$R_1R_2R_3As$
$R_1R_2R_3Sb$
$R_1R_2S$
$R_1R_2R_3N$ in which $R_1$ $R_2$ and $R_3$ may be the same or different and may be hydrogen, alkyl, aryl, cycloalkyl, aralkyl, alkaryl, or substituted alkyl, aryl, aralkyl and alkaryl substituents. Heterocyclic N-bases such as pyridine, dipyridyl, etc., are also suitable donor ligands.

Examples of suitable donor ligands are any of the following:

(a) organic isocyanides;
(b) organic compounds having in the molecule an atom of an element selected from groups 5B or 6B of the Periodic Table, that is, usually a N, P, As, Sb, O, S or Se atom, such atom being in such a valency state that it possesses a lone pair of electrons; and
(c) stannous or germanium (II) halides.

Preferred ligands within categories (a) and (b) include: tertiary amines, phosphines, arsines and stibines; organic nitriles and isocyanides; sulphoxides, phosphine oxides, dialkyl sulphides and mercaptans.

For example, there may be employed pyridine, quinoline or dimethylaniline; though less basic compounds are preferred, for example: tributyl or triphenyl phosphine, dimethylphenylarsine, triphenyl arsine or stibine, dibutyl sulphide, phenyl isocyanide or acetonitrile. Also to be treated as organic compounds for present purposes are ligands within category (b) such as phosphorous tri-isocyanate and phosphorous tri-isothiocyanate.

As we believe that the ligand is often the reducing agent responsible for the reduction of Rh(II) to Rh(I), we prefer to use those ligand-forming compounds which are susceptible to oxidation fairly readily, e.g. amines or phosphines may be readily oxidized to amine or phosphine oxides and are therefore more suitable as compounds functioning as stabilizing donor ligands.

Such donor ligands for stabilization purposes also include those ligands described as biphyllic ligands. By "biphyllic ligand" is meant a compound having an element with a pair of electrons capable of forming a coordinate bond with a metal atom and simultaneously having the ability to accept electrons from the metal, thereby providing additional stability to the resulting complex. The term "biphyllic ligand" has been defined by R. G. Pearson—see J.A.C.S. 82 787 (1960). The carbon monoxide molecule is an example of a suitable biphyllic ligand. The biphyllic ligand may also be a polydentate compound, coordinating at more than one position to the central metal atom or ion.

RHODIUM CARBOXYLATES

Rhodium (II) acetate, $R_2(OCOMe)_4$ has been obtained by the action of acetic acid on hydrous rhodium (III) oxide or ammonium chlororhodate (III) as a green solid, which readily forms adducts L. $Rh(OCOMe)_4$ Rh.L with a variety of ligands, L, including alcohols, amines, phosphines etc. An improved preparative procedure involves the interaction of commercial hydrated rhodium trichloride with sodium acetate in ethanol. A methanol solution of rhodium (II) benzoate may be obtained by an analogous procedure, and, as in the case of the acetate, adducts of the type L. Rh (OCOPh)₄ Rh.L may be isolated.

PREPARATION OF PROTONATED SOLUTION

The acetate, benzoate or similar carboxylate can be protonated in several ways, in either aqueous media or in organic solvents such as alcohols, to give a cationic species believed to be $Rh_2^{4+}$.

The protonation is preferably carried out using a strong acid and may, for example, be fluoboric acid, perchloric acid, fluosulphuric acid, trifluoromethane sulphuric acid, sulphuric acid or hydrofluoric acid; hydrofluoric acid may be used along or in combination with a Lewis acid such as $SbF_5$, $SiF_4$ or $BF_3$.

The protonation is most conveniently effected using aqueous fluoboric acid. Using 40% by weight of the aqueous acid, the methanol adduct of the acetate can be protonated quite rapidly on heating, but the temperature must be kept below 100° C. if decomposition and metal formation is to be avoided.

For the preparation of a protonated solution with little or no excess acid, for use in catalysis or for use in the preparation of a compound according to the present invention, the methanol adduct is protonated in methanol as solvent using slightly greater than stoichiometric amounts of acid. The solution should then be held at about 60° C. for approximately 16 hours under nitrogen.

The acetate may be protonated as a solid or in solution. Pure liquid fluosulphuric acid, hydrogen fluoride and trifluoromethyl sulphuric acid all dissolve the acetate giving stable green solutions. The last named of these acids may be used in place of fluoboric acid.

The protonation of rhodium (II) acetate

In a typical experiment the methanol adduct of rhodium (II) acetate (0.55 g.) in methanol (60 ml.) was treated with 40% aqueous fluoboric acid (1 ml.) and the solution held at 60° for about 16 hours, or conveniently overnight. The protonation was normally complete, but on cooling a portion to ca. −15° for a few hours, any unreacted acetate precipitated as the methanol adduct; a more rapid test for the present of incomplete protonation was to add triphenylphosphine in methanol when immediate precipitation of a red crystalline solid, $$Rh_2(OCOMe)_4 \cdot 2PPh_3,$$

indicated the presence of unprotonated acetate.

There is a large amount of physical and chemical evidence supporting the contention that these stable green solutions contain the cation $Rh_2^{4+}$.

After two or more treatments of the acetate with pure trifluoromethyl sulphuric acid at ca. 90° C. and evacuation evaporation, an exceeding deliquescent dark green solid, which appears to be the trifluoromethylsulphate, $Rh_2(CF_3SO_4)_4$ remains.

PREPARATION OF RHODIUM (I) FLUOBORATE COMPOUNDS (a) On addition of a saturated methanolic solution of triphenylphosphine, PPh₃, to the protonated solution, the color changes from green to red, and, after standing for some hours, and orange solid <u>A</u> precipitates.

The infra-red spectrum of <u>A</u> shows the presence of $BF_4^-$ ions and of PPh₃. The solid compound analyses as $Rh(PPh_3)_3BF_4$.

Conductivity measurements made in nitromethane and a graph plotting $(\Omega_o - \Omega_e)$ against $\sqrt{c}$ gives a slope of 74. This is considerably less than that required for a 1:1 electrolyte. It is, however, suggested that this result is due to ion-pair formation in which the fluoroborate ion is co-ordinated through fluorine to the metal.

(b) The complex readily and quantitatively reacts with LiCl to give $Rh(PPh_3)_3Cl$ and with $LiNO_3$ to give $Rh(PPh_3)_3NO_3$, a red solid melting at 120° C.

It is therefore reasonable to formulate solid <u>A</u> as $Rh(PPh_3)_3BF_4$, a monomeric Rh(I) species with the fourth coordination position occupied by $BF_4^-$.

Alternative formulations of <u>A</u> preserving an oxidation state formally as Rh(II) involve loss of an alipha-H atom of one of the phenyl rings to give Rh—C bonds. However, there is no infra-red evidence for the presence of a disubstituted phenyl ring and also no bond in the 2000 cm.⁻¹ region expected for Rh—H. Experiments in which solutions of the complex were exposed to $D_2$ gave no evidence for exchange either in infra-red spectra of the complex or mass spectroscopic analysis of the gas.

A high field resonance line by nuclear magnetic resonance study of the red phosphine containing solution under an atmosphere of $N_2$ or $H_2$ was not detected. The solution, however, even when saturated may have been too dilute for the detection of a metal hydride. (The phosphine complex rapidly precipitates from more concentrated solutions.)

The change of color of the phosphite solution from red to yellow when under hydrogen seems to indicate, however, that a hydride is formed in the presence of this gas.

(c) Although bubbling carbon monoxide through the protonated green methanolic solution causes no visible color change, the addition of excess triphenylphosphine to this solution, while maintaining an atmosphere of CO, produces an immediate orange color and orange crystals are obtained on cooling.

The crystals have stoichiometry $(Rh(CO)(PPh_3)_3)BF_4$. They are air stable and the infra-red spectrum shows the presence of carbonyl ($\nu_{CO}$ 2010 cm.⁻¹ in Nujol Mull), PPh₃ and $BF_4$ groups. Conductivity measurements in nitromethane indicate a 1:1 electrolyte (slope of $\Omega_o - \Omega_e$ against $\sqrt{c}$=169, molar conductivity ($10^{-3}$M) 79.0 ohm⁻¹ cm.⁻² mole⁻¹) and hence it is reasonable to formulate the species as the $BF_4^-$ salt of the square Rh(I) ion:

$$Rh(CO)(PPh_3)_3^+$$

This is confirmed by the treatment of a methanolic solution of the carbonyl under hydrogen with sodium borohydride at 30° when a quantitative yield of yellow solid identical with an authentic sample of $$RhH(CO)(PPh_3)_3$$

is obtained.

The following 3 examples (a), (b) and (c) refer in more detail to subsections (a), (b) and (c) appearing under the previous heading "Preparation of Rhodium (I) Fluoborate."

EXAMPLE (a)

Interaction of $Rh_2^{4+}$ with triphenylphosphine

To a methanol solution of $Rh_2^{4+}$ (20 ml. of the protonated solution prepared as described above) was added a saturated solution of triphenyl phosphine (0.8 g.) in methanol. There was an immediate color change to red, and on standing an orange precipitate of the complex was obtained essentially quantitatively. M.P. 92–93°. Found: C, 66.4; H, 5.0; P, 9.2. $C_{54}H_{45}BF_4P_3Rh$ i.e. $Rh(PPh_3)_3BF_4$ requires C, 66.4; H, 4.6; P, 9.5%. The solid was insoluble in most common organic solvents but slightly soluble in nitromethane in which it gave a conducting solution. Conductivity measurements were done in nitromethane using solutions varying in concentration from $10^{-2}$ to $10^{-4}$M. A straight line plot of $\Omega_o$ vs. $\sqrt{c}$ was extrapolated to give $\Omega_o$, and a further plot of $\Omega_o - \Omega_e$ vs. $\sqrt{c}$ gave a straight line passing through the origin.

EXAMPLE (b)

Interaction of $Rh(PPh_3)_3BF_4$ and LiCl

The orange rhodium complex (0.3 g.) was treated with excess LiCl (ca. 0.8 g.) in 2-methoxyethanol (20 ml.) and the mixture was gently refluxed under nitrogen for 15 mins. On cooling red crystals were obtained; these were washed with methanol and dried under vacuum. The melting point and infra-red spectrum of the crystalline material was identical to that of an authentic sample of RhCl(PPh$_3$)$_3$.

EXAMPLE (c)

Interaction of Rh$_2$$^{4+}$ with triphenylphosphine and CO

Carbon monoxide was bubbled through a methanol solution of Rh$_2$$^{4+}$ (ca. 40 ml. of the standard prepared solution made above which was subsequently treated with an excess of triphenylphosphine (ca. 1.5 g.) in methanol. The solution changed color from green to orange-red on addition of the phosphine, and after gently refluxing for a few hours under carbon monoxide, the solution became bright yellow. After concentration to approximately half the volume, the solution made under CO was chilled to ca. 5° overnight to give orange crystals of the complex which were washed with diethylether and dried under vacuum. Yield ca. 65% M.P. 190–191°. Found: C, 65.9; H, 4.9 C$_{55}$H$_{45}$BF$_4$OP$_3$Rh i.e. Rh(CO)(PPh$_3$)$_3$BF$_4$ requires C, 65.8; H, 4.5%. Conductivity measurements carried out in nitromethane as above gave a slope of 169 for $\Omega_o - \Omega_e$ vs. $\sqrt{c}$ plot, consistent with a 1:1 electrolytic species.

PREPARATION OF CARBOXYLATOTRIS(TRIPHENYLPHOSPHINE) RHODIUM (I) COMPLEXES

When a solution of Rh$_2$$^{4+}$ in methanol (prepared from rhodium (II) acetate by protonation with fluoroboric acid) containing triphenylphosphine (Rh: PPh$_3$, 1:4) and excess lithium acetate is heated, red crystals of the carboxylate, Rh(OCOCH$_3$)(PPh$_3$)$_3$, are obtained. Since the yield is over 80%, disproportionation of Rh$_2$$^{4+}$ to Rh$^I$ and Rh$^{III}$ can be excluded, and since triphenylphosphine oxide is formed in the reaction, reduction by triphenylphosphine is clearly involved as it in the preparation of RhCl(PPh$_3$)$_3$. Other carboxylates, either homologous or α-halogeno substituted, can be obtained similarly in high yields, although the butyrate and caproate are more soluble and only ca. 50% yields are obtained by crystallization from methanol at 25°. There is increasing solubility in non-polar solvents with increasing chain length as expected; the benzoate is quite soluble in diethylether (see Table 1).

The carboxylates show characteristic asymmetric carboxylate stretches around 1600 cm.$^{-1}$ and symmetric stretches at lower frequencies with the value of $$\Delta\nu(\nu_{as}CCO - \nu_sCOO)$$

being consistent with a unidentate carboxylate grouping. (See Table 2.) For halogeno substituted carboxylates the energies of $\nu_{as}$ and $\nu_s$ are higher than for the unsubstituted compounds. The chemical properties of $$Rh(OCOR)(PPh_3)_3$$

are generally similar to those of RhCl(PPh$_3$)$_3$ described and claimed in British Pat. 1,138,601 and the compounds will undergo oxidative-addition reactions, interaction with CO or aldehydes to give trans- Rh(OCOR)CO(PPh$_3$)$_2$ complexes, and will act as homogeneous hydrogenation catalysts for alkenes and alkynes.

TABLE 1
Analytical and other data for rhodium (I) complexes

| Compound | Yield, percent | Color | M.P., °C. | Calculated C | Calculated H | Found C | Found H |
| --- | --- | --- | --- | --- | --- | --- | --- |
| Rh(OCOCH$_3$)(PPh$_3$)$_3$ | 80 | Orange | 134–136 | 70.9 | 5.1 | 71.0 | 5.1 |
| Rh(OCOC$_2$H$_5$)(PPh$_3$)$_3$ | 75 | ___do___ | 134–135 | 71.2 | 5.2 | 71.1 | 5.4 |
| Rh(OCOC$_3$H$_7$)(PPh$_3$)$_3$ | 55 | ___do___ | 130–132 | 71.3 | 5.3 | 71.4 | 5.6 |
| Rh(OCOCH$_2$Cl)(PPh$_3$)$_3$ | 75 | ___do___ | 135–137 | 68.4 | 4.8 | 68.1 | 5.6 |
| Rh(OCOCClF$_2$)(PPh$_3$)$_3$ | 72 | ___do___ | 136–138 | 66.0 | 4.4 | 65.7 | 4.4 |
| Rh(OCOCF$_3$)(PPh$_3$)$_3$ | 70 | ___do___ | 138–139 | 67.1 | 4.5 | 67.2 | 4.6 |
| Rh(OCOC$_2$F$_5$)(PPh$_3$)$_3$ | 70 | ___do___ | 136–138 | 65.2 | 4.3 | 65.0 | 4.1 |
| Rh(OCOCH$_3$)(CO)(PPh$_3$)$_2$ | 95 | Yellow | 171–173 | 65.6 | 4.6 | 65.8 | 4.8 |
| Rh(OCOC$_2$H$_5$)(CO)(PPh$_3$)$_2$ | 90 | ___do___ | 147–148 | 65.9 | 4.8 | 65.8 | 5.2 |
| Rh(OCOCH$_2$Cl)(CO)(PPh$_3$)$_2$ | 95 | ___do___ | 172–174 | 62.6 | 4.3 | 62.3 | 4.6 |
| Rh(OCOCF$_3$)(CO)(PPh$_3$)$_2$ | 95 | ___do___ | 175–177 | 60.9 | 3.9 | 61.0 | 4.0 |
| Rh(OCOCF$_3$)(CO)(O$_2$)(PPh$_3$)$_2$ | 95 | ___do___ | 176–178 | 58.5 | 3.8 | 59.0 | 4.0 |
| Rh$_2$(OCOCH$_3$)$_4$(AsPh$_3$)$_2$ | 30 | Maroon | 267–268 | 50.0 | 4.0 | 49.8 | 4.1 |
| Rh$_2$(OCOC$_2$H$_5$)$_4$(AsPh$_3$)$_2$ | 30 | ___do___ | 228–229 | 52.0 | 4.5 | 52.4 | 4.4 |
| Rh(SnCl$_3$)(PPh$_3$)$_3$ | 95 | ___do___ | 128–129 | 58.2 | $^1$4.0 | 58.4 | 3.9 |
| (Me$_4$N)$_2$[Rh(SnCl$_3$)(PPh$_3$)] | 95 | Red | | 26.6 | $^2$3.3 | 26.3 | 2.8 |

$^1$ Sn, found, 10.5; calculated 10.6 percent.
$^2$ Cl, found, 27.3; calculated 27.2. N, found, 2.4; calculated 2.5. Sn, found, 30.7; calculated 30.3 Ω = 83.3 ohm$^{-1}$ cm$^2$ (10$^{-3}$ M nitromethane).

(a) Preparation of trichlorostannatobis-(triphenylphosphine) rhodium(I)

To a solution of tin(II) chloride (0.23 g.) in methanol (20 ml.) was added a solution of RhCl(PPh$_3$)$_3$ (0.96 g.) in methylene chloride (20 ml.) and the mixture was refluxed for 5 min. and then cooled to −10°. The resulting precipitate was washed with diethylether to give maroon crystals of the complex (a). The compound is fairly soluble in methylene chloride and nitromethane in which it is a poor conductor.

(b) Preparation of bis(tetramethylammonium)tris(trichlorostannato)triphenylphosphinerhodium(I)

A solution of RhCl(PPh$_3$)$_3$ (0.96 g.) in chloroform (20 ml.) was added to a solution of tin (II) chloride (0.7 g.) in acetone/methanol (20 ml. of a 1:1 mixture). The mixture was heated to boiling and a solution of tetramethylammonium chloride in methanol was added. Cooling the solution to −10° precipitated the complex (b) as a red powder. Ω$_e$(10$^{-3}$M) = 83.3 ohm.$^{-1}$ cm.$^{-1}$ in nitromethane.

TABLE 2
Infrared spectra of carboxylato complexes Rh(OCOR)(PPh$_3$)$_3$ and Rh(OCOR)(CO)(PPh$_3$)$_2$. (nujol or hexachlorobutadiene mulls, cm.$^{-1}$)

| Compound | $\nu_{as}$(COO) | $\nu_s$(COO) | $\nu_{as}-\nu_s$ | $\nu_{CO}$ |
| --- | --- | --- | --- | --- |
| Rh(OCOCH$_3$)(PPh$_3$)$_3$ | 1,601 | 1,370 | 231 | |
| Rh(OCOC$_2$H$_5$)(PPh$_3$)$_3$ | 1,599 | 1,379 | 220 | |
| Rh(OCOC$_3$H$_7$)(PPh$_3$)$_3$ | ($^1$) | 1,385 | | |
| Rh(OCOC$_5$H$_{11}$)(PPh$_3$)$_3$ | ($^1$) | 1,389 | | |
| Rh(OCOPh)(PPh$_3$)$_3$ | 1,590 | 1,355 | 235 | |
| Rh(OCOCH$_2$Cl)(PPh$_3$)$_3$ | 1,644 | 1,405 | 239 | |
| Rh(OCOCClF$_2$)(PPh$_3$)$_3$ | 1,673 | ($^1$) | | |
| Rh(OCOCF$_3$)(PPh$_3$)$_3$ | 1,673 | 1,418 | 255 | |
| Rh(OCOC$_2$F$_5$)(PPh$_3$)$_3$ | 1,685 | ($^1$) | | |
| Rh(OCOCH$_3$)(CO)(PPh$_3$)$_2$ | 1,608 | 1,377 | 231 | 1,976 |
| Rh(OCOC$_2$H$_5$)(CO)(PPh$_3$)$_2$ | 1,607 | 1,382 | 225 | 1,980 |
| Rh(OCOC$_3$H$_7$)(CO)(PPh$_3$)$_2$ | ($^1$) | ($^1$) | | 1,981 |
| Rh(OCOCH$_2$Cl)(CO)(PPh$_3$)$_2$ | 1,600 | 1,410 | 190 | 1,979 |
| Rh(OCOCClF$_2$)(CO)(PPh$_3$)$_2$ | ($^1$) | ($^1$) | | 1,980 |
| Rh(OCOCF$_3$)(CO)(PPh$_3$)$_2$ | 1,692 | 1,410 | | 1,982 |
| Rh(OCOC$_2$F$_5$)(CO)(PPh$_3$)$_2$ | | | | 1,981 |
| Rh(OCOCF$_3$)(O$_2$)(CO)(PPh$_3$)$_2$ | | | | 1,982 |

$^1$ Bands obscured.

The catalyst solutions were stirred under hydrogen for several minutes before addition of alkene and that rates were measured after a short period of rapid stirring under steady state conditions. Under such conditions, complete oxidative dissociation has occurred as shown by cryoscopy so that it is unlikely that oxygen affects the maximum rate for a given set of conditions as claimed.

The carboxylate system resembles the chloride in that the hydrogenated solutions are yellow and that if stirring in of $H_2$ is stopped in solutions containing large concentrations of alkene, the color rapidly becomes red. The kinetics are similar in both cases; in dilute solution, the rate of hydrogenation is approximately first order dependent in both rhodium and olefin concentrations. Table 3 gives some representative data comparing the acetate and chloro compounds, while Table 4 gives relative rates for hex-l-ene for different carboxylates.

TABLE 3

Comparative rates of hydrogenation of substrates using acetato and chlorotris(triphenylphosphine)rhodium(I); catalyst concentration 1 mM.; substrate 1 M in benzene, 25° C.; rate at 40 cm. Hg pressure

| Substrate | Uptake of $H_2$ in ml. min.$^{-1}$ at STP | |
| --- | --- | --- |
| | $Rh(OCOCH_3)$ $(PPh_3)_3$ | $Rh(Cl)$ $(PPh_3)_3$ |
| Hex-l-ene | 45.0 | 212.0 |
| Pent-l-ene | 31.8 | 204.8 |
| Hex-l-yne | 95.5 | 211.8 |
| Cyclohexene | <0.1 | 92.6 |
| Cyclooctene | <0.1 | |
| Cyclopentene | 20.6 | |
| Cycloocta-1,3-diene | 30.9 | |
| Cycloocta-1,5-diene | <0.1 | <0.1 |

TABLE 4

Relative rates of hydrogenation of hex-l-ene at 25 and 40° using tris-(triphenylphosphine)rhodium(I) complexes, catalyst concentration 1 mM.; hex-l-ene concentration 1 M; solvent benzene

| Compound | Rate of $H_2$ uptake in ml. min.$^{-1}$ at STP | |
| --- | --- | --- |
| | 25° | 40° |
| $Rh(Cl)(PPh_3)_3$ | 212.0 | >1,000 |
| $Rh(OCOCH_3)(PPh_3)_3$ | 45.0 | 168.5 |
| $Rh(OCOC_2H_5)(PPh_3)_3$ | 36.5 | 112.5 |
| $Rh(OCOCH_2Cl)(PPh_3)_3$ | <0.1 | 116.1 |
| $Rh(OCOCClF_2)(PPh_3)_3$ | <0.1 | 115.5 |
| $Rh(OCOCF_3)(PPh_3)_3$ | <0.1 | 116.9 |
| $Rh(OCOC_2F_5)(PPh_3)_3$ | <0.1 | 121.0 |
| $Rh(OCOPh)(PPh_3)_3$ | <0.1 | <0.1 |

The acetate is less than 0.25 time as effective as the chloride for hex-l-ene and hex-l-yne, but is less than 0.025 time as active towards cyclohexene. Steric or other factors involved, therefore, enable selective reduction to be carried out. The nature of the carboxylate has evidently no profound effect upon the rate of hex-l-ene hydrogenation, but the rates for the more electron withdrawing carboxylate groups are lower at 25°. However, at 25° (relative to the chloride) they are relatively faster than at 40°, possibly because of a lower tendency to form dimers with carboxylate bridges, which are known to be formed in concentrated solutions on warming, e.g. the butyrate rapidly precipitates the dimer from benzene.

We have found that compositions according to the present invention also catalyse isomerisation. For 1 mM. concentration of the acetate $Rh(OCOCH_3)(PPh_3)_3$ in pure benzene 1 M hexene at 25° and ca. 1 atm hydrogen, the hydrocarbon composition after 1 hour was: hex-l-ene 52.9% n-hexane, 41.5% cis+trans-hex-2-ene, 5-6%. Similarly, after 24 hours using the acetate the composition was hex-l-ene 23.5%, n-hexane 38.2%, trans-hex-2-ene, 22.6%, cis-hex-2-ene, 15.7%. The trifluoroacetate under similar conditions but after only ½ hour gave a similar mixture but with an additional 1-2% of hex-3-ene. The rates of hydrogenation and isomerisation are thus comparable for the carboxylates.

Reaction with carbon monoxide.—On bubbling carbon monoxide through a suspension of the Rh(I) acetate in benzene, the solid rapidly dissolves and a yellow solution is obtained from which yellow crystals of the complex trans-$Rh(OCOCH_3)(CO)(PPh_3)_2$ are obtained quantitatively.

$$Rh(OCOCH_3)(PPh_3)_3 + CO \rightarrow trans\text{-}Rh(OCOCH_3)(CO)(PPh_3)_2 + PPh_3$$

The i.r. spectrum shows that the carbonyl band $\nu_{CO}$ at 1976 cm$^{-1}$. (Table 1), and the assymmetric and symmetric carboxylate frequencies occur at higher energy than in the parent acetate consistent with a monodentate carboxylate grouping trans to CO. The other carboxylates behave similarly giving stable yellow crystalline solids of stoichiometry $Rh(OCOR)(CO)(PPh_3)_2$. (See Table 2.) The reaction is irreversible even in excess molten triphenylphosphine. The carboxylates also abstract CO from aldehydes (carbonylation). Thus, the acetate in benzene reacts quantitatively with n-heptaldehyde or valeraldehyde in the cold, or extremely rapidly on warming to give the trans carbonyl derivatives. Although the carbonyl acetate and other carboxylates are unreactive towards oxygen at atmospheric pressure and room temperature, the fluorocarboxylates are quite reactive and unless very thoroughly degassed benzene solutions are used, an orange-red oxygen adduct is formed reversibly.

The orange-red adduct $Rh^{III}(OCOCF_3)(CO)(O_2)$ $(PPh_3)_2$ has a band 833 cm.$^{-1}$ in the i.r. which is assignable to $\nu_{O-O}$. The oxygen adduct may be obtained by bubbling oxygen into the carbon monoxide saturated yellow solution above.

What we claim is:
1. A complex having the formula
$$Rh(CO)(PPh_3)_3BF_4$$
2. A method of preparing $Rh(CO)(PPh_3)_3BF_4$ which comprises bubbling carbon monoxide through a solution of rhodium (II) acetate protonated by fluoroboric acid and subsequently adding thereto an excess of triphenyl phosphine.

3. A method of manufacture of a salt of Rh(I) containing a stabilizing donor ligand which comprises adding excess triphenylphosphine as the stabilizing donor ligand to a solution of rhodium (II) acetate or benzoate protonated by an acid selected from the group consisting of fluoboric acid, perchloric acid, fluorosulphuric acid, trifluoromethane sulphuric acid, sulphuric acid and hydrofluoric acid.

References Cited
UNITED STATES PATENTS

| | | | |
| --- | --- | --- | --- |
| 3,098,843 | 7/1963 | Luttinger | 260—429 R |
| 3,480,659 | 11/1969 | Dewhirst | 260—429 R |
| 3,511,885 | 5/1970 | Hughes | 260—429 R |
| 3,644,446 | 2/1972 | Booth et al. | 260—429 R |
| 3,652,614 | 3/1972 | Dewhirst | 260—429 R |
| 3,660,493 | 5/1972 | Johnson et al. | 260—429 R |

OTHER REFERENCES

Griffith, The Chemistry of the Rarer Platinums Metals. Interscience Publishers, 1967, pp. 366, 370, 387, 389–392, 414–417.

Lawson et al. J. Chem. Soc. 1965, p. 1900–1907.

DANIEL E. WYMAN, Primary Examiner

A. P. DEMERS, Assistant Examiner

U.S. Cl. X.R.

252—431 C, 431 P; 260—270 R, 604 HF, 677 H, 683.65, 683.68, 683.9